United States Patent
Gillins et al.

(10) Patent No.: US 6,223,510 B1
(45) Date of Patent: May 1, 2001

(54) MOWER DECK WITH OBJECT TRACING CAPABILITY

(76) Inventors: Gary L. Gillins, 129 W. 210 North; Jason D. Gillins, 115 Cone St.; John Pruett, 3552 Cromwell La., all of Blackfoot, ID (US) 83221

( * ) Notice: Subject to any disclaimer, the term of this patent is extended or adjusted under 35 U.S.C. 154(b) by 0 days.

(21) Appl. No.: 09/327,923

(22) Filed: Jun. 8, 1999

(51) Int. Cl.[7] .......................... A01D 34/24; A01D 34/42; A01D 34/63
(52) U.S. Cl. ............................. 56/15.1; 56/15.3; 56/15.9
(58) Field of Search .................... 56/14.7, 15.1, 56/14.8, 15.7, 15.3, 15.8, 15.5, 15.9, DIG. 3, DIG. 10, DIG. 22, 14.9, 15.6, 208, 16.1, 16.2, DIG. 14

(56) References Cited

U.S. PATENT DOCUMENTS

| | | | |
|---|---|---|---|
| 2,662,561 | * 12/1953 | Duncan, Jr. | 30/379 |
| 3,274,762 | * 9/1966 | Jolls | 56/15.2 |
| 4,206,580 | * 6/1980 | Traux et al. | 56/10.4 |
| 4,497,160 | * 2/1985 | Mullet et al. | 56/6 |
| 4,518,043 | * 5/1985 | Anderson et al. | 172/6 |
| 4,829,754 | * 5/1989 | Shimamura et al. | 56/15.9 |
| 4,869,057 | * 9/1989 | Siegrist | 56/15.9 |
| 4,893,456 | * 1/1990 | Wallace | 56/15.5 |
| 5,079,907 | * 1/1992 | Sameshima et al. | 56/15.9 |
| 5,085,044 | * 2/1992 | Freier, Jr. et al. | 56/13.5 |
| 5,187,925 | * 2/1993 | Patterson et al. | 56/17.1 |
| 5,425,224 | * 6/1995 | Downey et al. | 56/15.8 |
| 5,483,789 | * 1/1996 | Gummerson | 56/15.5 |
| 5,715,667 | * 2/1998 | Goman et al. | 56/13.6 |
| 5,771,669 | * 6/1998 | Langworthy et al. | 56/6 |
| 5,771,672 | * 6/1998 | Gummerson | 56/15.4 |
| 5,775,075 | * 7/1998 | Dannar | 56/15.2 |
| 5,813,203 | * 9/1998 | Peter | 56/17.2 |
| 5,927,055 | * 7/1999 | Ferree et al. | 56/15.9 |
| 5,966,912 | * 10/1999 | Swisher et al. | 56/1 |
| 6,032,441 | * 3/2000 | Gust et al. | 56/7 |
| 6,085,508 | * 7/2000 | Miatt et al. | 56/17.1 |

* cited by examiner

*Primary Examiner*—William Neuder
*Assistant Examiner*—Árpád Fábián Kovács
(74) *Attorney, Agent, or Firm*—L. E. Carnahan

(57) ABSTRACT

A power drive riding type lawn mower having a manual and automatic lateral/angular movement of the mower deck to provide an object tracing capability. The tracer mower deck arrangement enables moving the deck horizontally and laterally in a direction perpendicular to the frame of the mower and at an angle with respect to the mower frame. A manual lever moves the mower deck transversely and laterally with respect to the mower frame, while an automatic deck positioning lever has numerous transverse positions and once set in a position, the mower deck can be moved laterally and angularly automatically by contact with an object and then returned to that set position. Also, a deck movement override mechanism provides an added safety feature which enables the mower deck to be secured and the automatic trace feature disabled. The mower deck is attached through a pivoted T-bar mechanism controlled by cables to the manual and automatic control levers, and enables the mower deck to move both laterally and at an angle with respect to the mower frame to trace around objects in the mowing path or to trace around square corners.

19 Claims, 8 Drawing Sheets

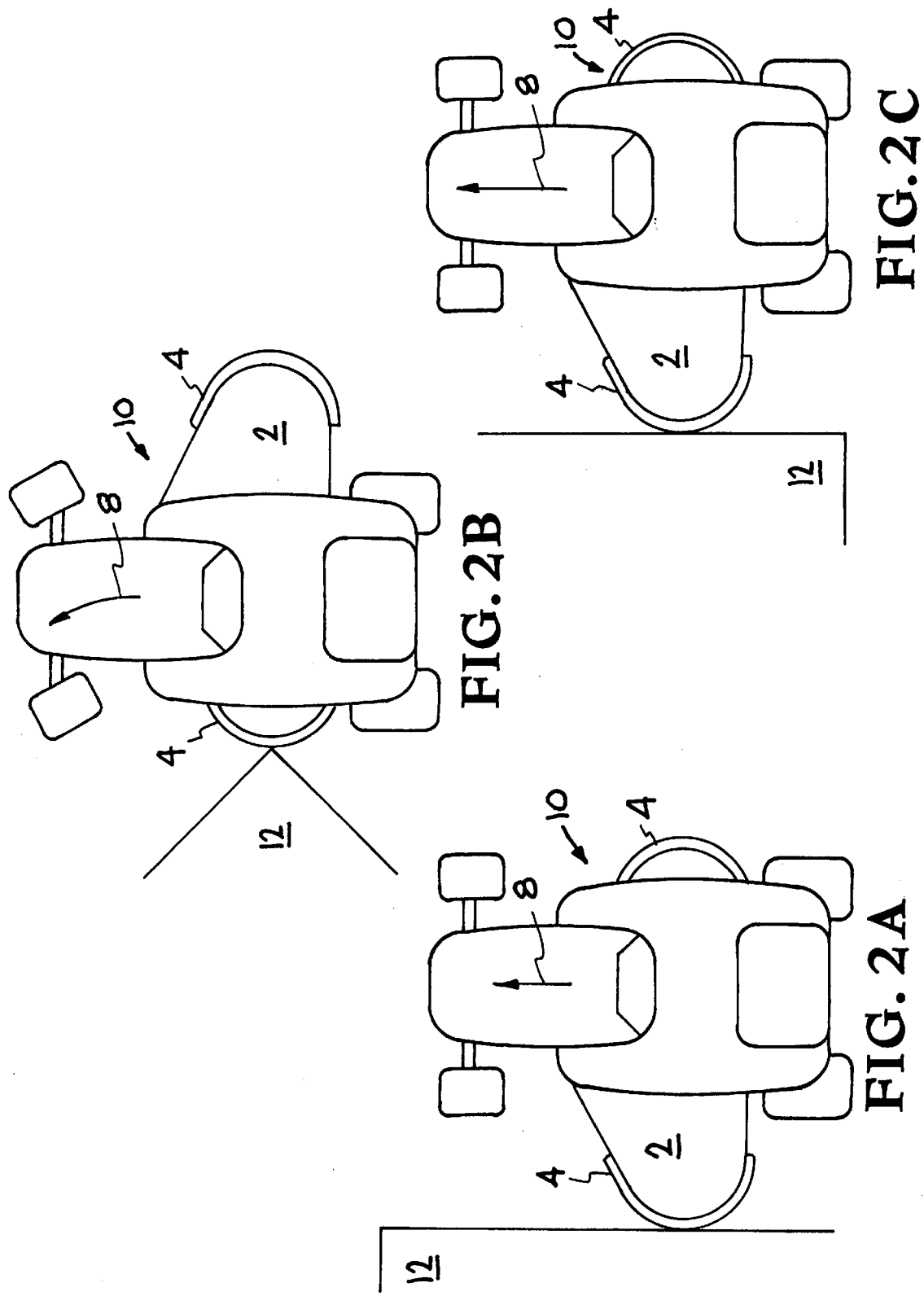

MOWER DECK WITH OBJECT TRACING CAPABILITY

BACKGROUND OF THE INVENTION

The present invention relates to mowing machines, particularly to mowing machines mounted on vehicles, and more particularly to a power driven mowing machine having a mower deck with object tracing capabilities which enables continuous mowing around objects, including objects having square corners.

Power driven mowing machines are extensively used for cutting grass in commercial, home and institutional applications. These mowing machines typically include a tractor-like motorized vehicle, with one or more mowers carried by the vehicle. Rotary lawn mowers carried by tractors or the like are frequently called "cutting decks" or "mowing decks", and each deck generally mows a swath along a path determined by the travel of the tractor. Where the deck is mounted on front, beneath, or behind the tractor, intermediate the front and rear wheels, it is substantially in line with the longitudinal axis or frame of the tractor, and the cutting path is substantially aligned with the travel path of the tractor. Typically, with tractor or vehicle mounted mowing or cutting decks, the cutting swath is wider than the wheels of the tractor.

In early vehicle mounted mowing decks, the maneuverability of the mowing decks depended on the maneuverability of the tractor and on the mounting location of the mowing deck. Thus, mowing of areas where the tractor could not safely or conveniently traverse, such as under shrubs or close to ditches, etc., mowing could not be carried out by the tractor driven mowers. Thus, hand mowing was required in these areas. This problem has been solved by the development of a movable or shiftable mowing deck which enables lateral movement of the mowing deck relative to the longitudinal direction of tractor movement. For example, U.S. Pat. No. 4,893,456 issued Jan. 16, 1990 provides a tractor mounted laterally shiftable mowing deck.

These early laterally shiftable mowing decks were controlled by the operator of the tractor or vehicle on which the mowing deck or decks were mounted. Thus, should an object in the mowing area not be seen by the operator, the mowing deck would strike the object causing damage to the mowing deck or cause flying material which could be hazardous. Also, if the mowing area included a tree or a post, for example, it was necessary for the operator to laterally move the mowing deck so that it could move around the tree, etc., which usually required the operator to slow the speed of the tractor to enable movement of the mowing deck sufficient to pass around the tree. In such application, a strip of unmown grass was usually on one side of the tree as the mowing deck could not be maneuvered fast enough to move the mowing deck around the edge of the tree. This problem was resolved, for example, by U.S. Pat. No. 5,425,224 issued Jun. 20, 1995 wherein a laterally movable, spring biased mowing deck was suspended under a tractor on a laterally extending mount such that the mowing deck was held by the spring in a predetermined location, and the mowing deck included a deck guard such that if the deck guard contacted a tree, for example, the mowing deck was laterally moved against the bias of the spring allowing the mowing deck to move around the tree and then back to its original predetermined position. U.S. Pat. No. 5,483,789 signed Jan. 16, 1996 provides a control system for a tractor mounted mowing deck which enables the deck to move vertically up or down, or moved laterally between a left limit and a right limit. Also, U.S. Pat. No. 5,771,672 issued Jun. 30, 1998 provided a system similar to that of above referenced U.S. Pat. No. 5,483,789 but also taught mounting the lateral support for the mowing deck or decks at an angle with respect to the longitudinal axis of the tractor to allow the operator greater maneuverability when passing between narrow objects or maneuvering around objects.

While these prior known laterally movable mowing decks have resolved many problems associated with tractor or vehicle mounted mowing applications, there has been a need for a tractor mounted power driven mowing deck which can continuously mow around square corners, such as cemetery headstones, grave markers, fenced areas, etc. In the past, it has been necessary for the operator to stop the mower after turning such a corner and then back up in order to mow the area just around the corner. Thus, in a cemetery, for example, considerable time is lost in mowing areas having square corners, or requiring the use of hand mowers or trimmers to cut that area just around each corner. While the lateral movable mowing deck of above referenced U.S. Pat. No. 5,425,224 enables mowing around trees, etc., it does not provide the capability to mow around square corners or square or rectangular cornered building or monuments because the movable mowing deck can only move laterally relative to the longitudinal axis of the tractor, and thus an area just around each corner of every corner of a square or rectangular area will be missed. Thus, there has been a need in the tractor (vehicle) mounted power driven mowing systems to enable mowing around square corners without missing an area or having to stop and back up to mow those areas just around the corners.

The present invention provides a solution to the above mentioned problem of mowing around square corners with a tractor mounted power driven mowing system. In this invention, the mowing deck mounting system is constructed to enable movement of the mowing deck both laterally and at an angle with respect to the longitudinal axis or frame of the tractor, whereby the mowing deck follows the contour of a building, monument, headstone, fence, etc. while the tractor is negotiating the corner, whereby the area just around the corner is mowed while the tractor continues around the corner at the same rate and then continues along that side of the building, monument, fence, etc. to the next corner which will be negotiated and mowed in the same manner. Thus, the present invention makes a substantial contribution to the state of the art tractor mounted power driven mowing systems.

SUMMARY OF THE INVENTION

It is an object of the present invention to provide a riding mower or tractor mounted mower having means for effectively mowing around corners and adjacent trees, posts and protruding objects.

A further object of the invention is to provide a mowing deck attachment to a riding mower or a tractor mounted mower which has object tracing capabilities and is laterally adjustable and angularly adjustable relative to the mower or tractor.

A further object of the invention is to provide manual and automatic lateral movement of a frame assembly of a riding lawn mower deck to provide an object tracing capability.

Another object of the invention is to provide a frame assembly for a mowing deck which is laterally and/or angularly adjustably responsive to the mowing deck encountering objects during mowing operation.

Another object of the invention is to provide a mowing deck for a riding mower and for a tractor which can mow around square corners without missing any area to be mowed.

Another object of the invention is to provide a riding mower or a tractor mounted mower with a mowing deck frame assembly that automatically moves laterally and/or angularly when the mowing deck contacts an object protruding from the mowing area.

Another object of the invention is to provide a frame assembly for a movable mowing deck with a safety stop mechanism.

Another object of the invention is to provide a mounting and control arrangement for a mowing deck frame assembly which enables the mowing deck to automatically move laterally, angularly, or laterally and angularly to enable continuous mowing around an object protruding from or adjacent to the mowing area so as to continuously mow around or adjacent to that object.

Other objects and advantages of the present invention will become apparent from the following description and accompanying drawings. Basically, the invention involves a frame assembly for a mowing apparatus having a mowing deck with object tracing capability to enable continuous mowing around an object such as a building, fence or monument corner, tree, post, etc. The mowing deck frame assembly of the present invention is secured to a riding mower or a tractor mounted mower so as to enable lateral and/or angular movement of the mowing deck to enable continuous mowing without missing areas to be mowed. The mower deck frame assembly is provided with manual and automatic lateral movement capability to enable object tracing, and to enable various positioning locations of the deck. The mower deck frame assembly of this invention can be mounted on equipment having rear wheel drive, front wheel drive, or large walk behind units. The operator may control the mowing deck by either a manual or automatic cable actuated arrangement which allows for selective positioning of the mowing deck while retaining its automatic lateral/angular movement. Also, a safety override arrangement is provided to stop movement of the mowing deck.

BRIEF DESCRIPTION OF THE DRAWINGS

The accompanying drawings, which are incorporated into and form a part of the disclosure, illustrate an embodiment of the invention and, together with the description, serve to explain the principles of the invention.

FIGS. 2A–2C illustrate the capability of the mowing deck frame assembly of the present invention to continuously trace and mow around a square corner.

DETAILED DESCRIPTION OF THE INVENTION

The present invention is directed to a power driven lawn mowing apparatus which includes a mowing deck which can be moved manually or automatically to enable tracing around an object in the mowing path or tracing around square corners with continuous movement of the mowing apparatus. The power driven mowing apparatus may be of a riding tractor mounted type or of a walk behind rotary type mower. The mowing deck is mounted and controlled to enable both lateral and angular movement with respect to the frame or axis on which the mowing deck is mounted whereby it can continuously and completely mow around square corners, for example, so as to eliminate either hand mower use or stopping, backing, and starting of the mower to mow that area just around a square corner. The frame assembly of the mowing deck of the present invention includes a T-bar frame arrangement suspended from a tractor frame, for example, and that T-bar frame can be moved via an operator control system which includes a manual and an automatic cable actuated arrangement. The mowing deck swings in an arching or angular movement but stays at a right angle from the tractor frame. In addition, the operator is provided with a safety override arrangement whereby lateral/angular movement of the mowing deck can be stopped. The invention incorporates a pulley/belt drive system for the mowing deck which enables continuous power to the mowing deck during all locations of the deck as determined automatically or by manual control.

Figure 1B:
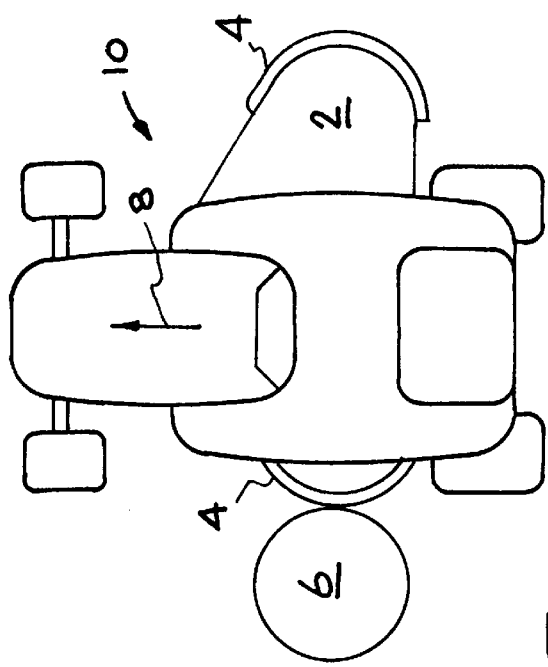
FIGS. 1A–1C illustrate the capability of the mowing deck of the present invention to automatically trace and mow about an object located in the mowing path.
Figure 1C:
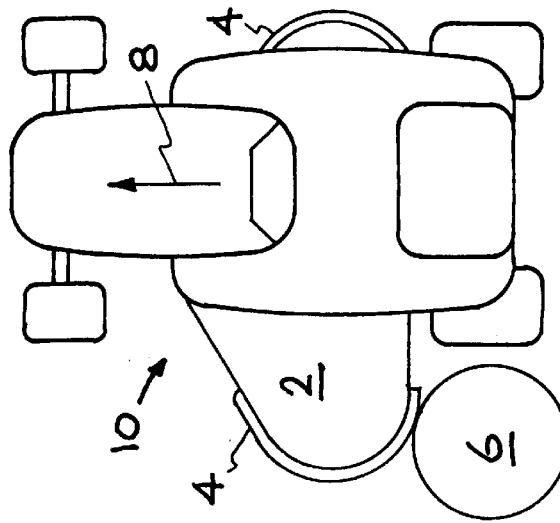
Figure 1A:
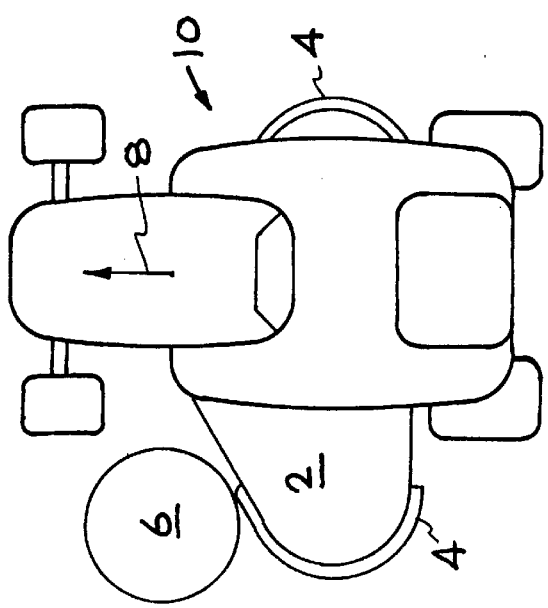

Referring now to the drawings, FIGS. 1A, 1B and 1C show a riding type mower equipped with object tracing capability, generally indicated at 10. FIG. 2A shows mower 10 with mowing or tracer deck 2 extended to the left. The tracer deck 2 has five available positions which are shown and explained in FIGS. 4 and 5. Tracer deck 2 incorporates an adjustable height protector ramp 4 which can be constructed, for example, from Teflon and provides a smooth barrier between an object 6 and tracer deck 2. This will prevent damage to objects when using the tracer deck 2 to mow around the objects. The mower 10 in FIG. 1A is proceeding in the direction indicated by arrow 8 and is encountering object 6. FIG. 1B shows mower 10 still moving in the direction of arrow 8 and that the mechanism of tracer deck 2 causes the deck 2 to move following the contours of object 6. FIG. 1C shows mower 10 past object 6 with the tracer deck 2 back in its original position, as in FIG. 1A. The mower 10 has been able to maintain a straight line and not have to perform any turning maneuvers to successfully mow around object 6. While not shown, the mower deck may be provided with adjustable deck skids for adjusting the height of the mower deck with respect to the ground. The deck skids may be incorporated into the adjustment member for the protective ramp or bumper 4.

FIGS. 2A, 2B and 2C show how the mower 10 can handle corners by simply turning the corner and the tracer deck 2 will follow the contour of the object 12.

Figure 3:
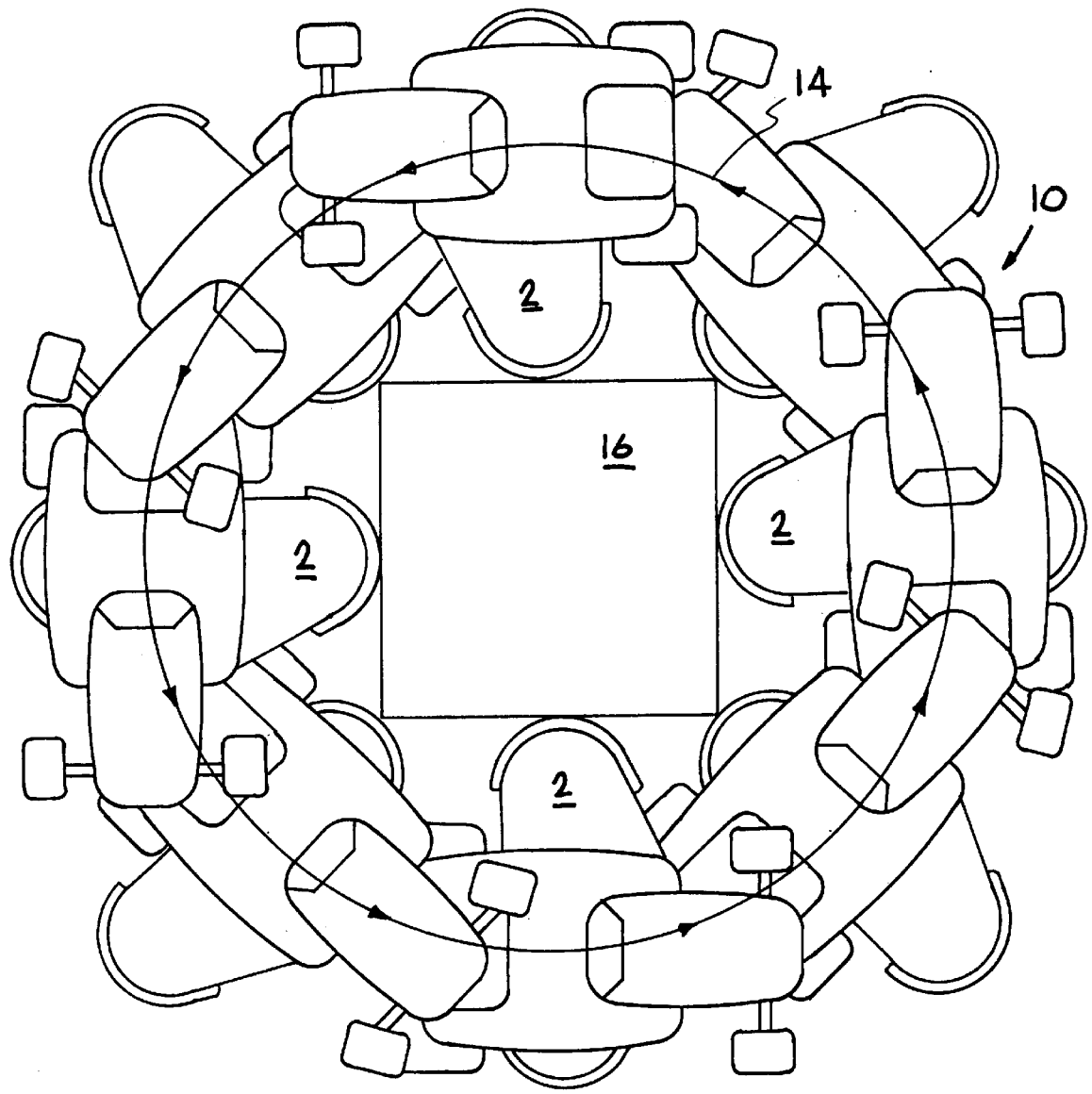
FIG. 3 illustrates the tracing and mowing capability of the mowing deck of the invention to continuously mow around an object having square corners.

FIG. 3 shows how by following a simple circular path 14 the mower can easily cut around, in this case, a square object 16. The tracer deck 2 can conform to almost any contour that the mower 10 can navigate.

Figure 4:
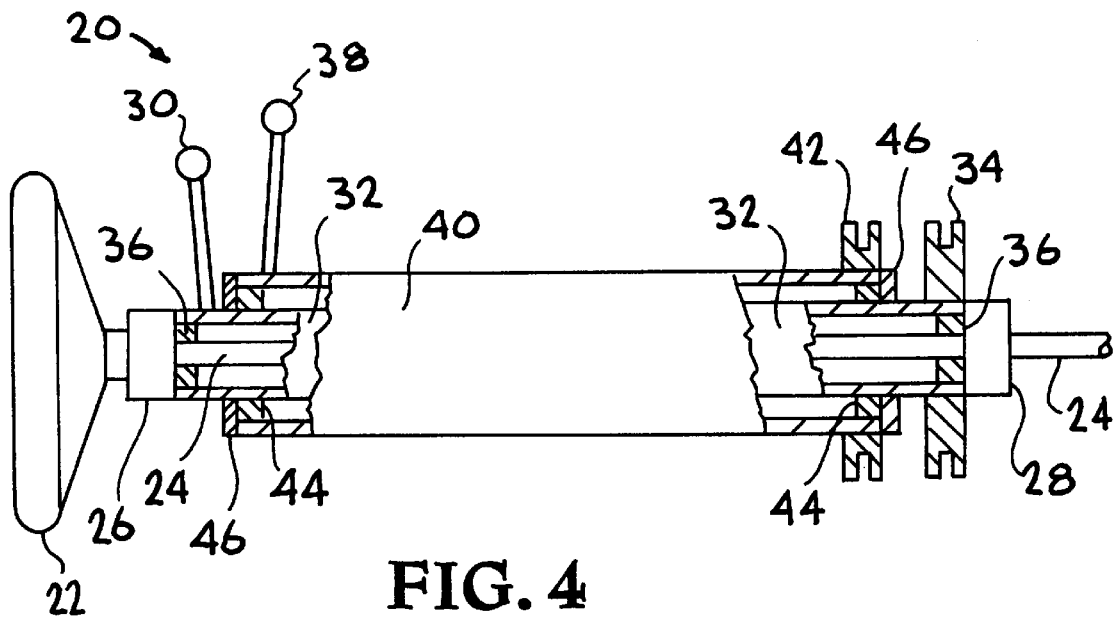
FIG. 4 illustrates in partial cross section an embodiment of an operator manual system and automatic control system for a tractor mounted mowing deck frame assembly of the present invention.

FIG. 4 shows the tracer deck 2 operator controls, generally indicated at 20. The steering wheel 22 and steering shaft 24 provide the standard directional control for the mower 10. Upper support bushing 26 and lower support bushing 28 are connectedly located in the mower frame (not shown) and serve the dual purpose of supporting the steering wheel and shaft as well as maintaining the location of the tracer deck operator controls. These controls consist of a manual control system and an automatic control system. The manual system is made up of a manual control lever 30 connected to the manual control torque tube 32. On the further end of torque tube 32 is positioned manual control pulley 34 fixed to tube 32. The items are concentric to shaft 24 but restrained from contact by bushings 36. The bushings 36 permit shaft 24 and tube 32 to rotate independently. The automatic control system has a lever fixed to torque tube 40 which also has a pulley 42 affixed to tube 40 at the farther end. Bushings 42 perform the same function as bushings 36. Retainers 46 permit rotation on automatic torque tube 40 while maintaining the tube in its lateral position.

Figure 5:
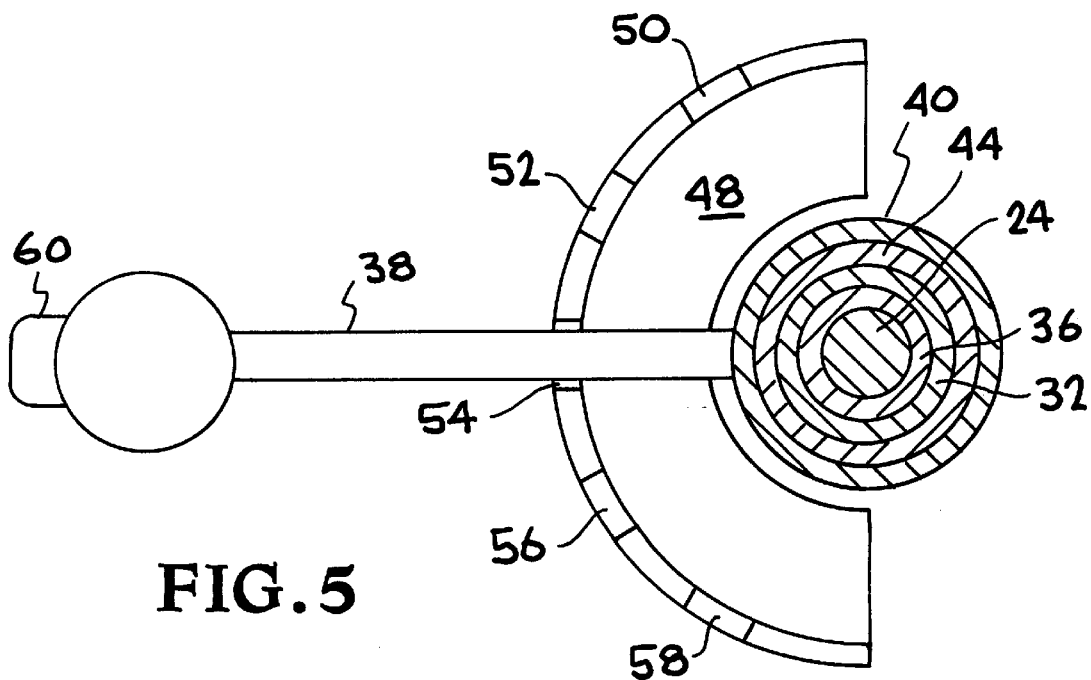
FIG. 5 is a cross sectional view of the control system of FIG. 4 showing the various control lever positions of the automatic control system.

FIG. 5 is a cross section of FIG. 4 taken near automatic control lever 38. Quadrant 48, which can be fixed to the dash area of mower 10, has five slots indicated at 50, 52, 54, 56 and 58. These slots serve to locate the position of the tracer deck 2. The full right slot 50 will move the deck to its farthest right position and the mid-right slot 52 will locate the deck to the mid-position. The deck center slot 54 will place the deck in the centered position in relation to the mower 10, while the mid-left slot 56 and full left slot 58 move the deck to the left. The lever 38 has a button 60. Depressing button 60 will release a detent (not shown) that locks lever 38 in the selected slot position. This allows lever 38 to be moved to another slot position. Releasing button 60 will allow the detent to engage the chosen slot.

Figure 6:
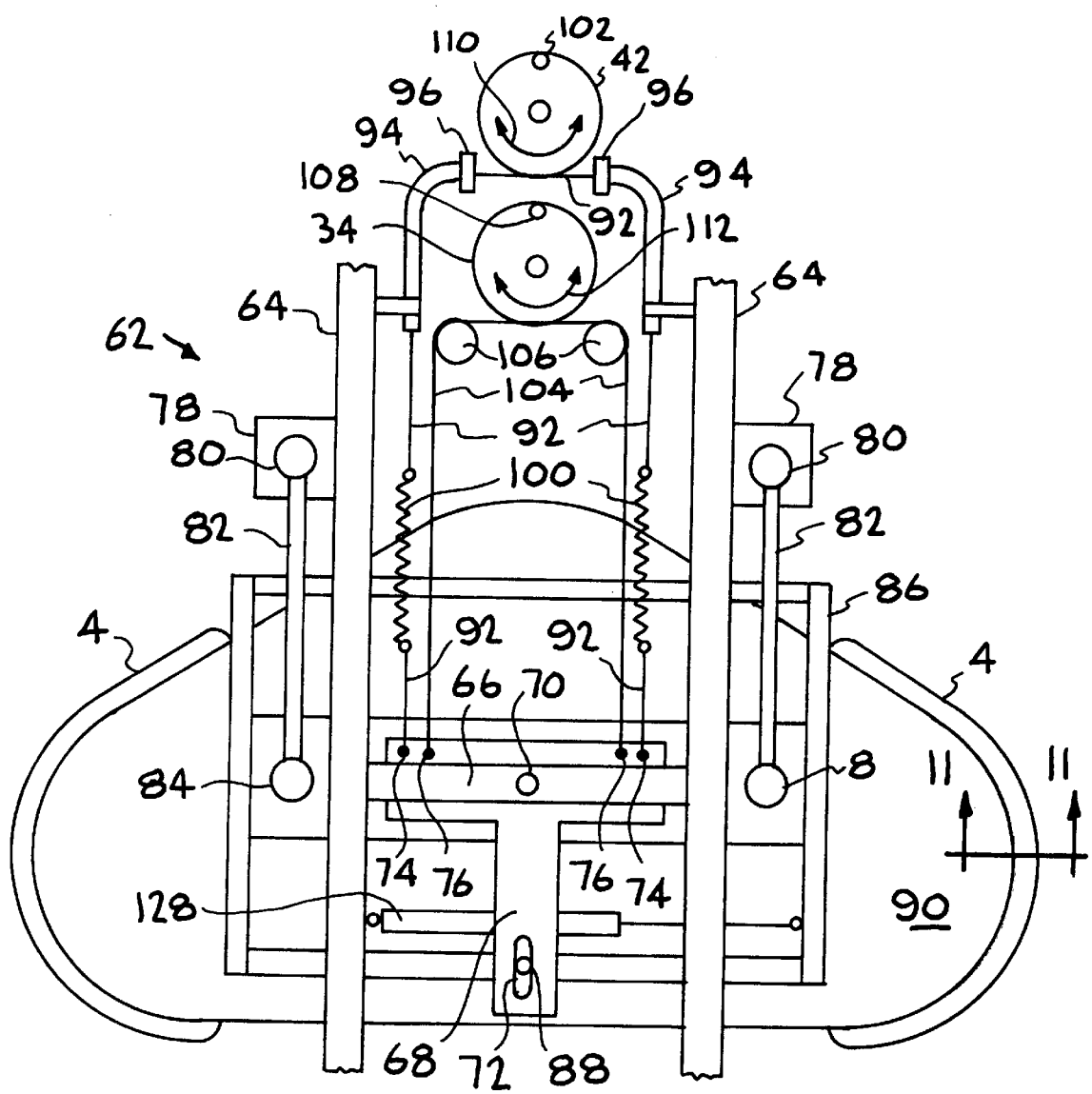
FIG. 6 is a view of the overall mowing deck frame assembly support and control system with a partially exploded view of the control system of FIG. 4 showing the control cable arrangement mounted to the mowing deck frame positioned between and under a tractor frame.

FIG. 6 illustrates the tracer deck mechanism, generally indicated at 62. The body of mower 10 is removed and the mower frame members 64 are shown. Cross member 66 bolts between frame rails, and from this member is suspended T-bar 68 through pivot point 70. The T-bar 68 has a slot 72, which is also a third stabilizing point for the pivot frame. The bar 68 also has anchor points 74 for the auto control cable 92, as well as anchor points 76 for manual control cable 104. Mower frame 64 has brackets 78 mounted on both frame rails. To these brackets 78 are mounted pivot bearing 80. Pivot bearing 80 is connected by a rigid link 82 to pivot bearing 84, which is mounted to pivot frame 86. Pivot frame 86 has a pin 88 fixed in a frame member. The pin 88 resides in slot 72 of T-bar 68. Also, a shoulder bolt with a head instead of the pin may be used to help stabilize. The cutting deck 90 is suspended from pivot frame 86 (shown in FIGS. 8 and 9).

FIG. 6 also shows schematically the auto control cable pulley 42 and manual control pulley 34. The manual control cable 104 fastens to T-bar 68 at anchor point 76. Cable 104 passes through guide pulley 106 and loops around pulley 34, and is anchored to pulley 34 at point 108. The cable 104 then continues and passes through another guide pulley 106 and proceeds back to T-bar 68 where it is secured by anchor point 76.

The auto control cable 92 is secured at one end to T-bar 68 by anchor point 74. Cable 92 has a spring 100 for part of its length. Cable 92 then enters cable housing 94 which guides the cable but allows it to slide within the housing 94. Housing 94 is positioned on the mower by brackets 96 and 98. Cable 92 then loops around auto control pulley 42 and is anchored to the pulley at point 102, continues through another cable housing 94 mounted on brackets 96 and 98, and continues back toward bar 68. This section of cable 92 also has a section consisting of a spring 100. The cable 90 finally terminates at anchor point 74 on T-bar 68. Both pulley 42 and 34 can rotate either right or left as shown by arrows 110 and 112.

Figure 7:
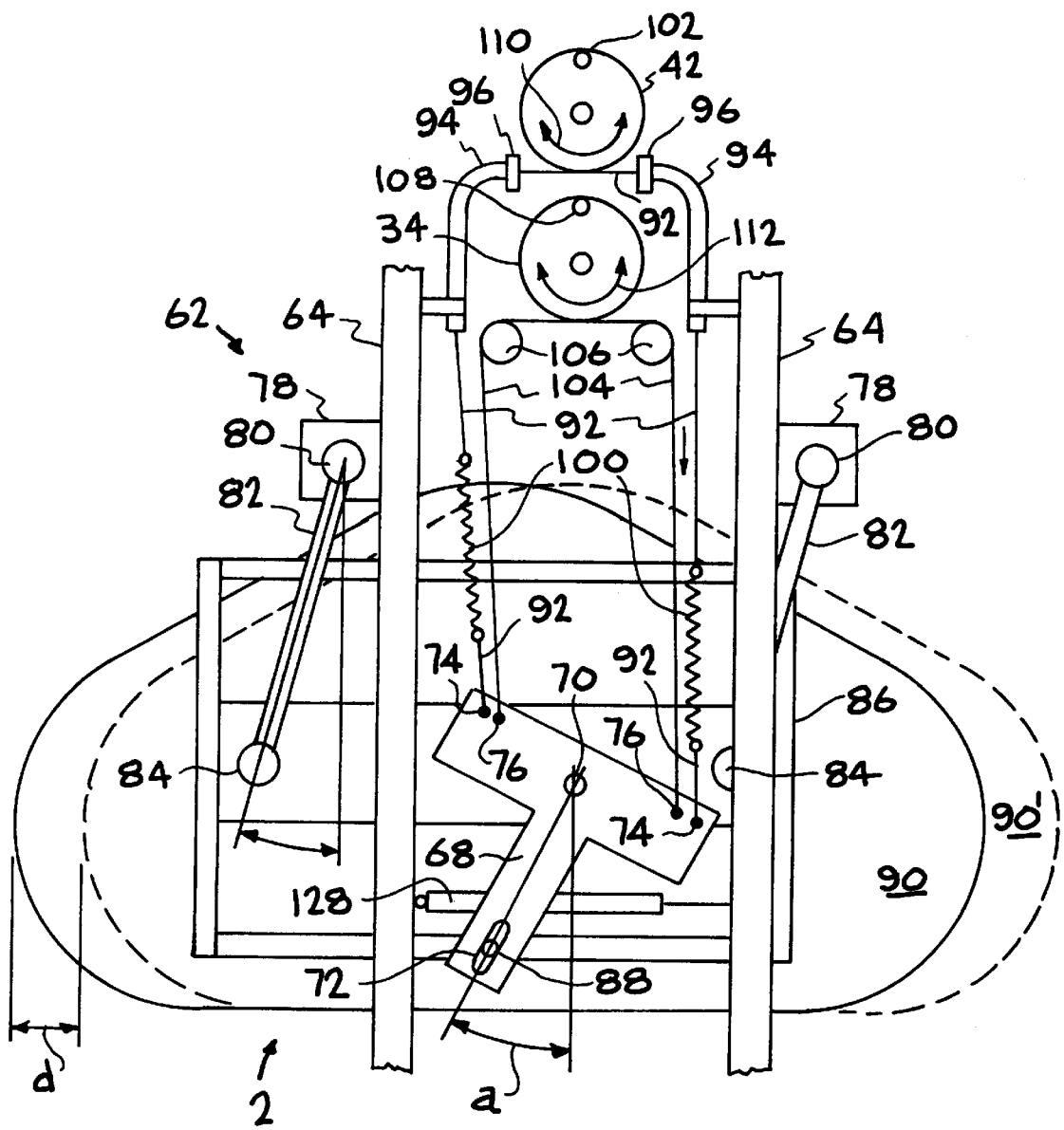
FIG. 7 illustrates the apparatus of FIG. 6 in a shifted position with respect to the frame or axis of the tractor on which it is mounted.

FIG. 7 shows tracer deck 2 shifted at distance d to the left from the deck center position. This is done by moving either of the control levers 30 and 38 shown in FIG. 4. Moving these levers will rotate their attached torque tubes and respective pulleys 34 and 42. While not illustrated, the deck swings in an arching or angular movement as it moves from left to right or right to left.

If we position auto control lever 38 to the mid-left slot 56, this will rotate pulley 42 moving cable 92 in the direction of arrow 114. This in turn causes T-bar 68 to rotate on its pivot point 70. The cross member 66 seen in FIG. 6 is not shown here to ease viewing of bar 68. Bar 68 will rotate through angle a. As the bar 68 moves, pin 88 fastened to pivot frame 86 and restrained in slot 72 will be forced to move along with bar 68, and this will move the pivot frame 86 and the attached cutting deck 90. The rigid links 82 and their pivot bearings 80 and 84 will move the tracer deck 2 in a parallelogram motion the above mentioned distance d to the left of the centered position.

When the auto control lever is moved, the manual control lever will also move as the manual control cable 104 is a fixed length. However, at any time, the manual control lever 30 may be used and this will overcome the springs 100 in the auto control system and manually move the tracer deck. Upon release of lever 30, the springs 100 will return tracer deck to whatever position the auto control lever 38 has previously been set. The manual lever can also be used as a deck position locator to find the position of the deck without looking at the deck.

If the mower 10 should encounter any object, such as those illustrated and described in FIGS. 2 or 3, the force generated by the object would overcome the springs 100 in auto control system and allow the tracer deck 2 to mow around the object, the springs allowing the deck 2 to essentially trace around an object. Once an object has been passed, the springs 100 would restore tracer deck 2 to any previously set position.

A damper or shock absorber 128, having one end fixed to mower frame and the other end fixed to the pivot frame 86, will aid in smooth operation of tracer deck 2 by damping any oscillations of springs 100 introduced by tracer deck 2 movements.

Figure 8:
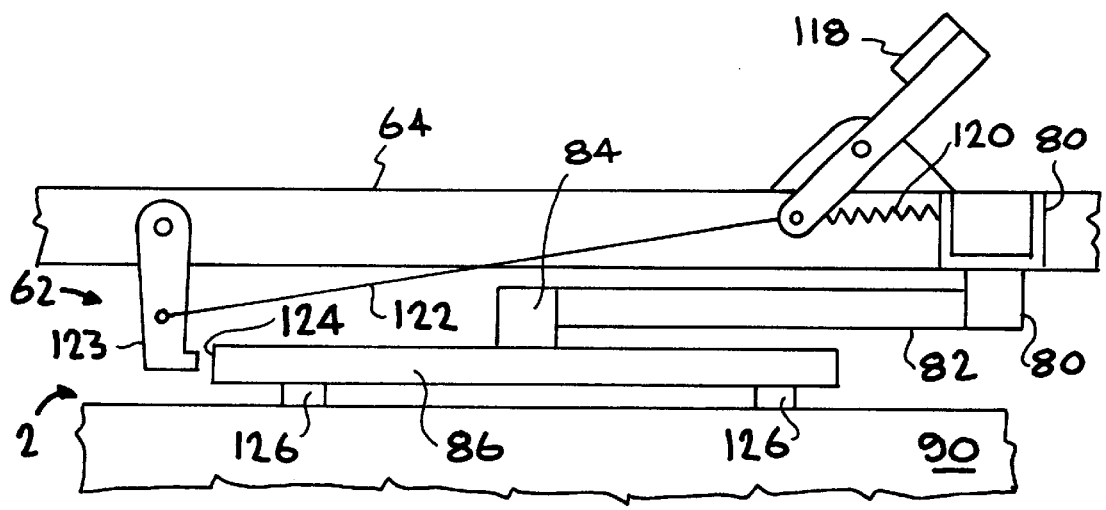
FIG. 8 is a partial side view showing a pedal actuated safety override of the movement of the mowing deck.

FIG. 8 is a partial side view showing the mower frame 64 and tracer deck mechanism 62. As can be seen here, the tracer deck is suspended by bearings 80 and 84 and rigid line 82 beneath the mower frame. The cutting deck 90 is mounted to the pivot frame 86 by cutter deck supports 126 which can be adjusted to set the height of the cutting deck 90.

FIG. 8 shows a method of locking the deck from any movement auto or manual should the operator need to do so. If the operator keeps the foot pedal 118 depressed, the tracer deck 2 is free to move. If the operator releases the pedal 118, the spring 120 will cause link 122 to move locking arm 123 to engage detent 124 on the pivot frame 86 freezing further motion of the tracer deck 2. Upon depressing the pedal 118, the locking arm 123 is disengaged from detent 124 and free movement of tracer deck 2 can resume.

Figure 9:
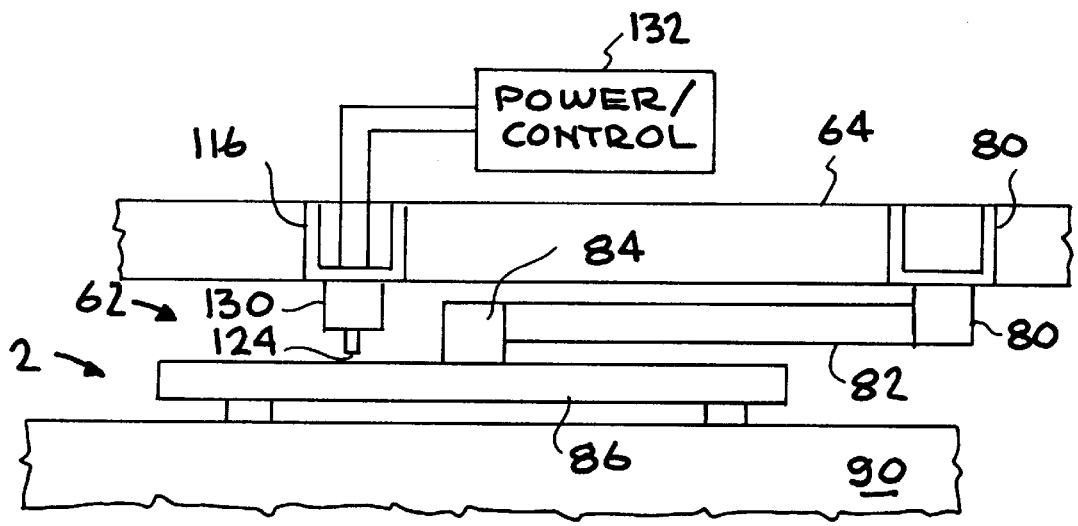
FIG. 9 illustrates an alternate safety override for the mowing deck using an electrical activator.

FIG. 9 shows an alternate method of stopping the tracer deck 2 motion. Here solenoid 130 engages a detent 124 upon a signal from power/control 132. Also, a shoe brake assembly may be used for stopping the movement of the mower deck.

Figure 10A:
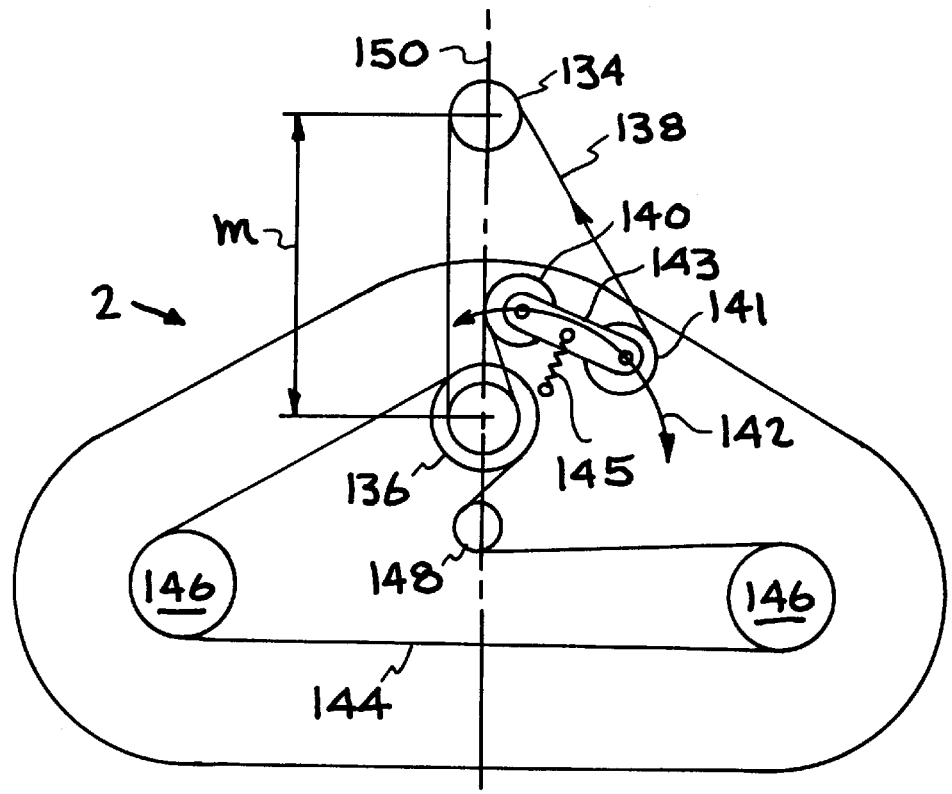
FIGS. 10A and 10B schematically illustrate an embodiment of a pulley/belt system for driving the mowing deck in different mowing deck positions.

FIG. 10A shows an embodiment of a system of belts and pulleys used to drive the cutting blades for tracer deck 2. In FIG. 10A, the deck 2 is shown in its centered position that is on center line 150 of mower 10. There is a power pulley 134, power belt 138, step pulley 136, idler pulley 140, and tension pulley 141 connected via a spring 145 to deck 2, and which can be positioned along an arc 142 by the tension of spring 145 to maintain proper belt tension A separate blade belt 144 receives power from the step pulley 136 and provides power to the blade pulleys 146. An idler pulley 148 is part of this system. The power pulley 134 and step pulley 136 are separated by distance m.

Figure 10B:
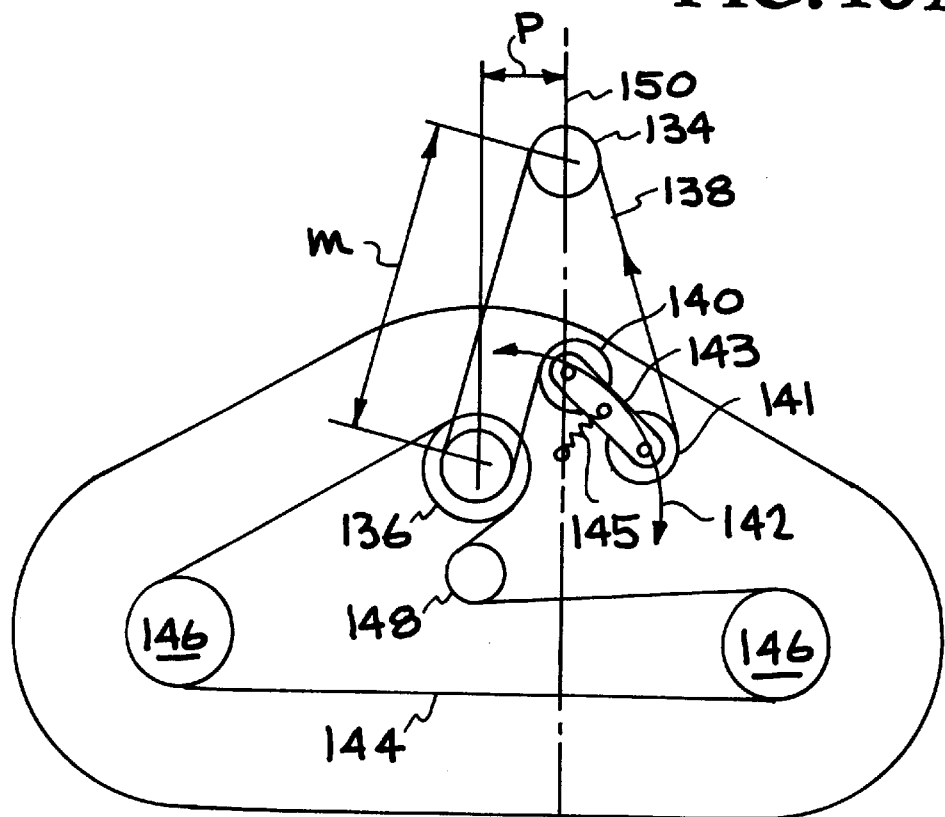

FIG. 10B shows that the tracer deck 2 has moved a distance p from the center line 150 position, and this brings about a change in the distance m between power pulley 134 and step pulley 136. The proper belt tension in power belt 138 is maintained by the repositioning of tension pulley 142 along arc 142.

Figure 11:
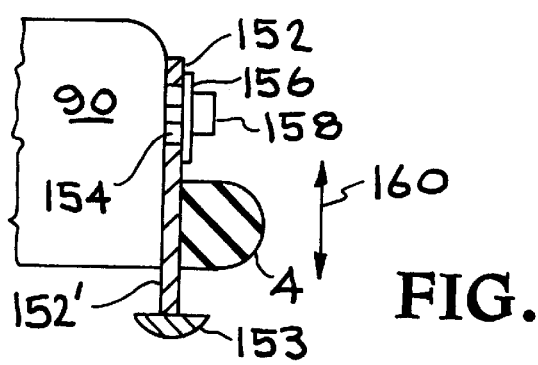
FIG. 11 illustrates an embodiment of an adjustable bumper or protector ramp.

FIG. 11 illustrates an embodiment of a height adjustment mechanism for the protector ramp or bumper 4 of the mowing deck. As shown, a member 152 secured to bumper 4 is provided with a slot 154, and a member 152 is adjustably secured to deck 90 by a bolt 158 having a lock washer 156. Member 152 extends below deck 90 to form a deck skid 152' on the end of which is mounted a shoe or member 153.

It has thus been shown that the present invention provides a substantial advance in that of the art of riding type lawn mowers by enabling the mowing deck to negotiate various objects, including square corners, while the mower apparatus continues in a driven direction. The lateral/angular movement of the mowing or trace deck of the present invention eliminates the prior problems associated with mowing around square corners, thus enabling a continuous mowing operation around objects such as cemetery headstones, monuments fenced areas, etc., as well as providing a continuous mowing path with objects such as trees, posts, etc. in the mowing path without damage to the objects. In addition to the manual and automatic lateral/angular movement capabilities of the mowing deck, a safety override mechanism is provided. Each of the controls are positioned so as to enable an operator to have full control of the positioning of the mowing deck, whether manually, automatically or safety override.

While a particular embodiment of the invention has been illustrated and described, such is not intended to be limiting. Modifications and changes may become apparent to those skilled in the art, and it is intended that the invention be limited only by the scope of the appended claims.

What is claimed is:

1. In a power driven riding type lawn mower, having a mowing deck movable laterally with respect to a horizontal axis of a mowing apparatus on which the mowing deck is mounted, the improvement comprising:
    a movable mowing deck which is movable laterally and angularly with respect to the axis of such an associated mowing apparatus to enable the movable mowing deck to trace around objects, including objects having square corners, and
    means for controlling the movement of said mowing deck,
    said means including a frame assembly which includes a pivotable T-shaped assembly mounted to said movable mowing deck,
    said pivotable T-shaped assembly including a slot adapted to cooperate with a pin in a member of said frame assembly, whereby pivotal movement of said T-shaped assembly causes said member of said frame assembly to be moved by said pin in said slot thereby moving said movable mowing decks.

2. The improvement of claim 1, wherein said means includes a pair of movement control mechanisms for said movable mowing deck, one of said pair of movement control mechanisms having a plurality of control settings for determining a location of said movable mowing deck with respect to the axis of associated mowing apparatus.

3. The improvement of claim 2, wherein each of said pair of movement control mechanisms includes a pulley assembly connected to a control shaft, movement of which is controlled by a control lever.

4. The improvement of claim 3, wherein said control lever of one of said pair of movement control mechanisms includes said plurality of control settings.

5. The improvement of claim 3, wherein said movable mowing deck mounted to said frame assembly is adapted to be mounted to such an associated mowing apparatus, said T-shaped assembly being connected to a pulley assembly of each of said pair of movement control mechanisms.

6. The improvement of claim 5, wherein said frame assembly is connected to each pulley assembly of said pair of movement control mechanisms via a pair of cables which extend around each said pulley assembly and connected to spaced locations on said pivotable T-shaped assembly.

7. The improvement of claim 6, wherein one of said pair of cables is connected at each end to said pivotable T-shaped assembly via a pair of springs.

8. The improvement of claim 6, wherein said pivotable T-shaped assembly is provided with means for preventing lateral or angular movement of said movable mowing deck.

9. The improvement of claim 8, wherein said means for preventing movement includes a mechanism actuated either mechanically or electrically.

10. The improvement of claim 3, wherein said pair of movement control mechanisms are coaxially mounted with respect to each other.

11. The improvement of claim 10, wherein said pair of movement control mechanisms are additionally coaxially mounted with respect to a steering column of such an associated mowing apparatus.

12. The improvement of claim 1, wherein said movable mowing deck is provided with a protective device mounted to an outer end surface of said mowing deck.

13. The improvement of claim 1, additionally including means for preventing lateral and angular movement of said movable mowing deck.

14. The improvement of claim 1, additionally including a power pulley assembly and belt assembly adapted to drive mowing assemblies mounted to said movable mowing deck, and including means for adjusting tension of the belt assembly when said movable mowing deck is moved laterally and angularly.

15. The improvement of claim 1, wherein said frame assembly includes a pair of pivotable members mounted to such an associated mowing apparatus.

16. The improvement of claim 15, additionally including shock absorption means mounted intermediate said frame assembly and such an associated mowing apparatus.

17. A riding lawn mower comprising:

a power driven mechanism, a movable mowing deck operatively mounted to said power driven mechanism so as to be supported and driven by said power driven mechanism, said movable mowing deck being mounted to a frame assembly operatively connected to said power driven mechanism, said frame assembly being operatively connected to a control assembly for controlling movement of said movable mowing deck, said control assembly including a pivotable member operatively connected to a member of said frame assembly, said control assembly additionally including a pair of pulley assemblies, each pulley assembly being connected to said pivotable member by opposite ends of a cable, said ends of one of said cables being connected to said pivotable member via a pair of springs, said control assembly also including means for rotating each of said pulley assemblies causing pivoting of said pivotable member, said pivotable member being operatively connected to a said member of said frame assembly, whereby pivotal movement of said pivotable member causes movement of said frame assembly and lateral and angular movement of said movable mowing deck.

18. In a power driven riding type lawn mower, having a mowing deck movable laterally with respect to a horizontal axis of a mowing apparatus on which the mowing deck is mounted, the improvement comprising:

a movable mowing deck which is movable laterally and angularly with respect to said axis of such an associated mowing apparatus, means for controlling the movement of said movable mowing deck to enable tracing around objects having square corners, said means including a pair of hand operated movement control mechanisms for said movable mowing deck, one of said pair of movement control mechanisms having a plurality of control settings for determining a side-to-side location of said movable mowing deck with respect to said axis of such an associated mowing apparatus, each of said pair of movement control mechanisms including a pulley assembly connected to a control shaft, movement of which is controlled by a control lever.

19. The improvement of claim 16, wherein at least one of said movement control mechanisms includes a cable connected to a frame assembly, which includes a T-bar, said movable mowing deck being mounted to said frame assembly.

* * * * *